United States Patent Office 2,759,798
Patented Aug. 21, 1956

2,759,798
LOW DENSITY SILICA GEL

Charles E. Waring, Baltimore, and Dorothy K. Shipley, Annapolis, Md., assignors to W. R. Grace & Co., New York, N. Y., a corporation of Connecticut No Drawing. Application June 30, 1953, Serial No. 365,255

12 Claims. (Cl. 23—182)

This invention relates to low density silica gels and to their methods of preparation. In another aspect, it relates to a method whereby the density of the silica gel so produced may be controlled.

It is known that the density of silica gel produced by the neutralization of sodium silicate by a mineral acid may be lowered to a limited degree by subjecting the gel to an elevated temperature in a non-dehydrating atmosphere, or by treatment with water above the boiling point in a pressurized vessel. It has also been disclosed that even lower density silica gels may be produced by subjecting the hydrogel to a pressure of the order of 100 to 150 lbs. per square inch to remove a substantial quantity of the mother liquor and then subjecting the pressed hydrogel to the action of saturated steam at about 80 lbs. per square inch for a period of about four hours, and then drying the hydrogel. However, these methods do not contemplate the production of a low density hydrogel immediately upon neutralization of the alkali silicate, but rather they depend upon subsequent physical treatment to reduce the apparent density of the material.

In accordance with the present invention, it is now possible to produce a white, fluffy, and exceedingly friable silica gel having a density in the range 0.2 to 0.3 grams per cubic centimeter, and which upon ball milling exhibits a particle size of about 3 microns. This material exhibits acceptable settling characteristics and has good non-caking qualities when tested in a commercial lacquer.

According to the present invention, a water emulsion of an organic carboxylic acid ester is added with rapid stirring to an alkali metal silicate solution. Sufficient dilute mineral acid is then added rapidly, with stirring to effect neutralization of about 30% of the silicate solution. The resulting mixture is allowed to gel and then washed with very dilute mineral acid followed by tap water to remove soluble salts. The thus treated hydrogel is then dried at temperatures ranging between 200° and 300° F.

We may use any water soluble alkali metal silicate, which is precipitated by acid. However, we prefer the use of sodium silicate because it is readily available and is cheaper than the others. The acid employed may be any suitable mineral acid which will react with alkali metal silicate to effect gelation. Sulphuric acid is normally preferred because of its relatively low cost. The organic ester employed may be any relatively short chain carboxylic acid ester, preferably an ester of a monocarboxylic acid, which is liquid at ordinary temperatures and which is immiscible with water. Ethyl acetate is particularly well suited for the reaction. The ester is the contributing factor to the production of the low density silica gel and neutralization of the silicate in the presence of the water emulsion of an ester constitutes the crux of the invention. While the ester is the primary factor in the preparation of this low density gel, the method by which the desired effect is accomplished is not precisely known. We believe that the ester acts as a "stopper" in that it interferes with or limits the polymerization of the silica.

As already stated, the ester is added to the silicate solution as a water emulsion. Any suitable commercial emulsifying agent may be employed to facilitate preparation of the emulsion, for example, "Span 80" and "Tween 80," manufactured by the Atlas Powder Company.

The present invention is further explained by the following illustrative but non-limiting examples.

EXAMPLE I

About 37½ grams of ethyl acetate were emulsified with 100 grams of water in a Waring blender with the aid of a few drops of "Span 80" and "Tween 80." This emulsion was added to 400 grams of a 32.5° Bé. sodium silicate (3.28 $SiO_2$:1$Na_2O$) solution with rapid stirring. Then, 10.8 cc. of concentrated $H_2SO_4$ in 200 grams of water was rapidly added with stirring. The added acid was sufficient for 25% neutralization of the $Na_2O$ and the silica concentration of the entire mixture was about 14%. A gelatinous precipitate was immediately formed, followed at once by complete gelation of the entire mixture. Although the solution was originally slightly cloudy, it changed abruptly to a white opaque material upon gelation. The resulting gel, though moderately firm, was unusually soft for a gel of 14% silica concentration. It was washed on a suction filter with about 5 liters of 0.1 N $H_2SO_4$ followed by several liters of tap water to remove sodium salts. The material was dried for 16 hours at about 220° F. The material dried without appreciable shrinkage to an opaque, white, fluffy and exceedingly friable product having the following properties:

T. V. _____ 21.10%.
$SiO_2$ _____ 99.23 dry basis.
$Na_2O$ _____ 0.28% dry basis
$SO_4$ _____ 2.44% dry basis.
Area _____ 620 sq. meters/gram (nitrogen adsorption) after activation at 1000° F. for 3 hours.

Density (compacted): G./cc.
1. Sample hand ground to minus 80 mesh ____ 0.27
2. Waring blended sample (12 minutes) _____ 0.13
3. Ball milled sample (2 hours) _____ 0.5

The material of Example I and three commercial silica gels were subjected to toluene settling tests, whereby two grams of each powdered sample and 89 cc. portions of toluene were mixed and hand shaken in separate four ounce bottles for one minute (about 120 shakes). The contents of each bottle was then poured into a 100 cc. graduate and allowed to stand for 16 hours. The results were as follows:

Material: Height of floc (cc.)
New material (Example 1) _____ 41
Commercial Silica 1 _____ 28
Commercial Silica 2 _____ 16
Commercial Silica 3 _____ 27

The material of Example 1 was also tested in a commercial lacquer. Mill bases were made up in a commercial lacquer by Waring blending for 10 minutes 130 grams of lacquer and 13 grams of silica. The materials were set aside for one week. The new material formed a soft readily redispersible cake.

EXAMPLE II

*Omitting ethyl acetate*

About 137½ grams of water, to take the place of the ethyl acetate emulsion added in Example I, were added to 400 grams of 37.5° Bé. sodium silicate (3.28 $SiO_2$:1 $Na_2O$)

A dilute sulfuric acid solution consisting of 10.8 cc. of $H_2SO_4$ and 200 cc. of water, sufficient to effect 25% neutralization, was then added with stirring to the silicate solution. A soft gel formed at once which was broken up and washed on a suction filter in the same manner as the gel of Example I. The material was dried in a manner similar to the method of Example I, and exhibited little shrinkage on drying. The compacted density of a Waring blended sample was 0.48 gram/cc. as compared with a density of 0.13 gram/cc. for the material of Example I.

The density measurements of the Waring blended samples of Examples I and II were carried out in the same manner in order to determine the precise effect of the addition of ethyl acetate upon the product. All other factors being equal, the low density of the product of Example I is attributed to the presence of the ester during neutralization.

The silica concentration in Example I amounted to about 14% of the total sol. An increase in the silica concentration above this figure, the degree of neutralization remaining the same, will produce a more dense gel. Thus it is possible to control density within certain limits by varying the concentration of silica in the sol.

Density may also be controlled within more narrow limits by varying the degree of neutralization of the alkali silicate at a constant silica concentration. The density of the resulting silica gel is lowered as the degree of neutralization approaches an upper limit of about 30%.

The contributing factor to the overall decrease in density of the silica product is the presence of the ester during neutralization.

In order to clearly illustrate the effects of silica concentration, and of ester upon the density of the product, attention is directed to Table 1 below. In obtaining the data for Table 1 in each instance, a 1:1 emulsion of ethyl acetate and water plus a few drops of "Span 80" and "Tween 80" were added with stirring to a sodium silicate solution (3.28 $SiO_2$:1 $Na_2O$) containing 100 grams of $SiO_2$. This mixture was acidified with sufficient 60% $H_2SO_4$ to effect the desired degree of neutralization, as shown, with continued stirring. Set time was observed and the resulting gel allowed to age for 2 hours, after which it was broken up, slurried with 1½ liters of 0.25 N $H_2SO_4$ and allowed to stand for 2 hours. The gel was then filtered and again slurried with an equivalent quantity of acid and allowed to stand for 18 hours. The gel was again filtered and washed on the filter with 1 liter of tap water after which it was dried for 18 hours at 250° F. A sample was Waring blended for 5 minutes and the compacted density recorded.

TABLE 1

| Degree of Neutralization | Silica Content, percent | Ethyl Acetate (Parts/100 parts silica) | Set time (minutes) | Density (grams/cc.) |
| --- | --- | --- | --- | --- |
| 20% | 14 | 10 | 120 | 0.51 |
|  | 14 | 25 | 6 | 0.26 |
|  | 14 | 40 | 5 | 0.25 |
|  | 20 | 10 | (¹) | (¹) |
|  | 20 | 25 | 22 | 0.42 |
|  | 20 | 40 | 22 | 0.46 |
| 25% | 14 | 10 | 60 | 0.35 |
|  | 14 | 25 | 7 | 0.24 |
|  | 14 | 40 | 6 | 0.25 |
|  | 20 | 10 | (¹) | (¹) |
|  | 20 | 25 | 17 | 0.43 |
|  | 20 | 40 | 18 | 0.44 |
| 30% | 14 | 10 | 22 | 0.16 |
|  | 14 | 25 | 1 | 0.19 |
|  | 14 | 40 | 1 | 0.20 |
|  | 20 | 10 | 120 | 0.38 |
|  | 20 | 25 | 20 | 0.40 |
|  | 20 | 40 | 20 | 0.45 |

¹ Failed—no gelation.

When the degree of neutralization and the concentration of the ester remain fixed, an increase in the silica content from 14% to 20% causes an appreciable increase in product density.

For a silica concentration of 14% and a given concentration of ester, the density of the product decreases as the degree of neutralization of the alkali metal silicate is increased from 20% to 30%. Neutralization of more than 30% of the silicate does not further reduce the density of the silica gel product.

At 14% silica content and 20% neutralization, increasing the concentration of ester from 10 to 25 parts/100 parts $SiO_2$ produces a marked lowering of product density. When the same 14% silica is 25% neutralized, increasing the ester from 10 to 25 parts also reduces the product density although not to the extent observed in connection with a 20% neutralization. At 14% silica and 30% neutralization, increasing the ester concentration above 10 parts/100 parts $SiO_2$ causes a slight increase in the density of the product. Increasing the ester concentration from 25 to 40 parts causes no significant change in density whether 20%, 25%, or 30% of the silicate be neutralized.

A minimum density product is attained by 30% neutralization of a sodium silicate solution containing 14% silica in the total sol, in the presence of about 10 parts of ethyl acetate per 100 parts of silica.

Having thus disclosed our invention and described in detail illustrative manners in which it may be carried out, what we desire to secure by Letters Patent is defined in what is claimed.

We claim:

1. The process of forming a relatively low density silica gel which comprises acidifying with a mineral acid a solution of an alkali metal silicate containing an aqueous emulsion of a saturated lower aliphatic carboxylic acid ester to form a gelatinous precipitate of silica hydrogel.

2. The process of forming a relatively low density silica gel which comprises mixing an aqueous solution of an alkali metal silicate with an aqueous emulsion of a saturated lower aliphatic carboxylic acid ester and acidifying the mixture with a mineral acid to form a gelatinous precipitate of silica, allowing the precipitate to set to a firm gel, washing the resulting gel to remove soluble salts and drying the same.

3. The process described in claim 2 wherein the alkali metal silicate is sodium silicate 4. The process described in claim 2 wherein the mixture of alkali metal silicate and carboxylic acid ester is acidified with sulfuric acid.

5. The process described in claim 2 wherein the carboxylic acid ester is ethyl acetate.

6. The process described in claim 2 wherein the acidification is conducted by the addition of sufficient mineral acid to effect neutralization of only about 25 to 30% of the alkali metal silicate.

7. The process described in claim 2 wherein the alkali metal silicate is present in an amount sufficient to produce a sol containing about 14% silica.

8. A process for controlling the density of silica gel comprising providing sufficient aqueous alkali metal silicate solution to produce a gelatinous precipitate containing up to 20% by weight silica upon acidification, commingling with said silicate solution an aqueous emulsion emulsion of a saturated lower aliphatic carboxylic acid ester, the quantity of ester in said emulsion being between 10 and 40 parts by weight of ester per 100 parts by weight of silica in said silicate solution, acidifying the mixture of silicate and ester with sufficient mineral acid to effect neutralization of between 20 and 30% of the alkali metal silicate, allowing the resulting precipitate to set to a firm gel, washing the gel to remove soluble salts and drying the same.

9. The process described in claim 8 wherein the carboxylic acid ester is ethyl acetate.

10. The process described in claim 8 wherein the alkali metal silicate is sodium silicate.

11. The process described in claim 8 wherein the mineral acid is sulfuric acid.

12. A process for producing an exceedingly friable silica gel having a density between 0.13 and 0.35 g./cc. comprising providing a body of aqueous sodium silicate sufficient to produce a gelatinous precipitate containing about 14% by weight silica upon acidification, commingling with said sodium silicate solution an aqueous emulsion of ethyl acetate, the quantity of ethyl acetate in said emulsion being between 10 and 40 parts by weight ester per 100 parts by weight silica in said silicate solution, acidifying the mixture of sodium silicate and ethyl acetate with sufficient dilute sulfuric acid to effect neutralization of between 20 and 30% of the sodium silicate, allowing the resulting precipitate to set to a firm gel, washing the gel to remove soluble salts and drying the same.

References Cited in the file of this patent

UNITED STATES PATENTS

| 1,762,228 | Holmes | June 10, 1930 |
| 2,496,736 | Maloney | Feb. 7, 1950 |

FOREIGN PATENTS

| 795,514 | France | Mar. 16, 1936 |
| 380,796 | Great Britain | Sept. 14, 1932 |

OTHER REFERENCES

Mellor: "Comprehensive Treatise on Inorganic and Theoretical Chemistry," volume 6, page 291.